United States Patent
Iwashita et al.

(10) Patent No.: US 7,828,131 B2
(45) Date of Patent: Nov. 9, 2010

(54) CLUTCH-MANIPULATION ASSIST MECHANISM

(75) Inventors: Kanau Iwashita, Saitama (JP); Atsuko Niwano, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 502 days.

(21) Appl. No.: 11/902,787

(22) Filed: Sep. 25, 2007

(65) Prior Publication Data

US 2008/0090701 A1 Apr. 17, 2008

(30) Foreign Application Priority Data

Sep. 28, 2006 (JP) ............................. 2006-265299

(51) Int. Cl.
 *F16D 25/08* (2006.01)
 *F16D 23/12* (2006.01)
(52) U.S. Cl. ..................... 192/83; 192/30 W; 192/85.5; 192/85.53; 192/85.57; 192/96; 192/99 S
(58) Field of Classification Search .................. 192/83, 192/96, 99 S, 85.5
See application file for complete search history.

(56) References Cited

U.S. PATENT DOCUMENTS

| | | | |
|---|---|---|---|
| 3,908,514 A | | 9/1975 | Rist |
| 4,585,105 A | * | 4/1986 | Iio et al. ...................... 228/139 |
| 4,650,055 A | * | 3/1987 | Ooka ..................... 192/85 CA |
| 5,109,968 A | * | 5/1992 | Pollitt et al. .................. 192/83 |
| 5,413,200 A | * | 5/1995 | Hirata ......................... 192/40 |
| 6,290,045 B1 | | 9/2001 | Klatt |
| 7,591,358 B2 | * | 9/2009 | Pick ............................ 192/83 |

FOREIGN PATENT DOCUMENTS

| | | |
|---|---|---|
| CN | 2752537 Y | 1/2006 |
| DE | 197 25 302 A1 | 12/1998 |
| DE | 103 19 785 A1 | 11/2004 |
| FR | 2.114.038 | 6/1972 |
| JP | 58-152938 A * | 9/1983 |
| JP | 2005-67450 A | 3/2005 |
| WO | WO 2005/093277 A1 | 10/2005 |

OTHER PUBLICATIONS

Machine translation of FR 2114038, dated Feb. 22, 2010.*
Machine translation of FR 2114038.*

* cited by examiner

*Primary Examiner*—Richard M. Lorence
(74) *Attorney, Agent, or Firm*—Birch, Stewart, Kolasch & Birch, LLP

(57) ABSTRACT

A clutch-manipulation assist mechanism of a vehicle clutch mechanism is capable of disconnecting power of an engine and is provided to a power transmission path which transmits the power of the engine to a rear wheel. The clutch-manipulation assist mechanism includes a push rod member which is arranged near the clutch mechanism and which is movable in the axial direction interlockingly with a power cutoff of the clutch mechanism due to the manipulation of a clutch lever by a rider. An axial movement of the push rod member is assisted by an actuator in response to a detection of the clutch lever manipulation by the rider using a stroke sensor, thus reducing a manipulation force of the clutch lever. A detection lug of the stroke sensor detects a movement quantity of a shaft end of the push rod member.

20 Claims, 5 Drawing Sheets

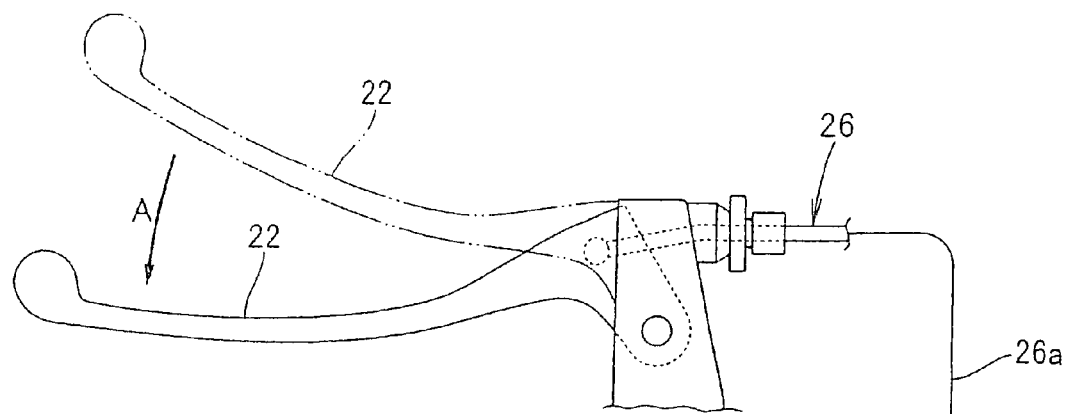
FIG. 3
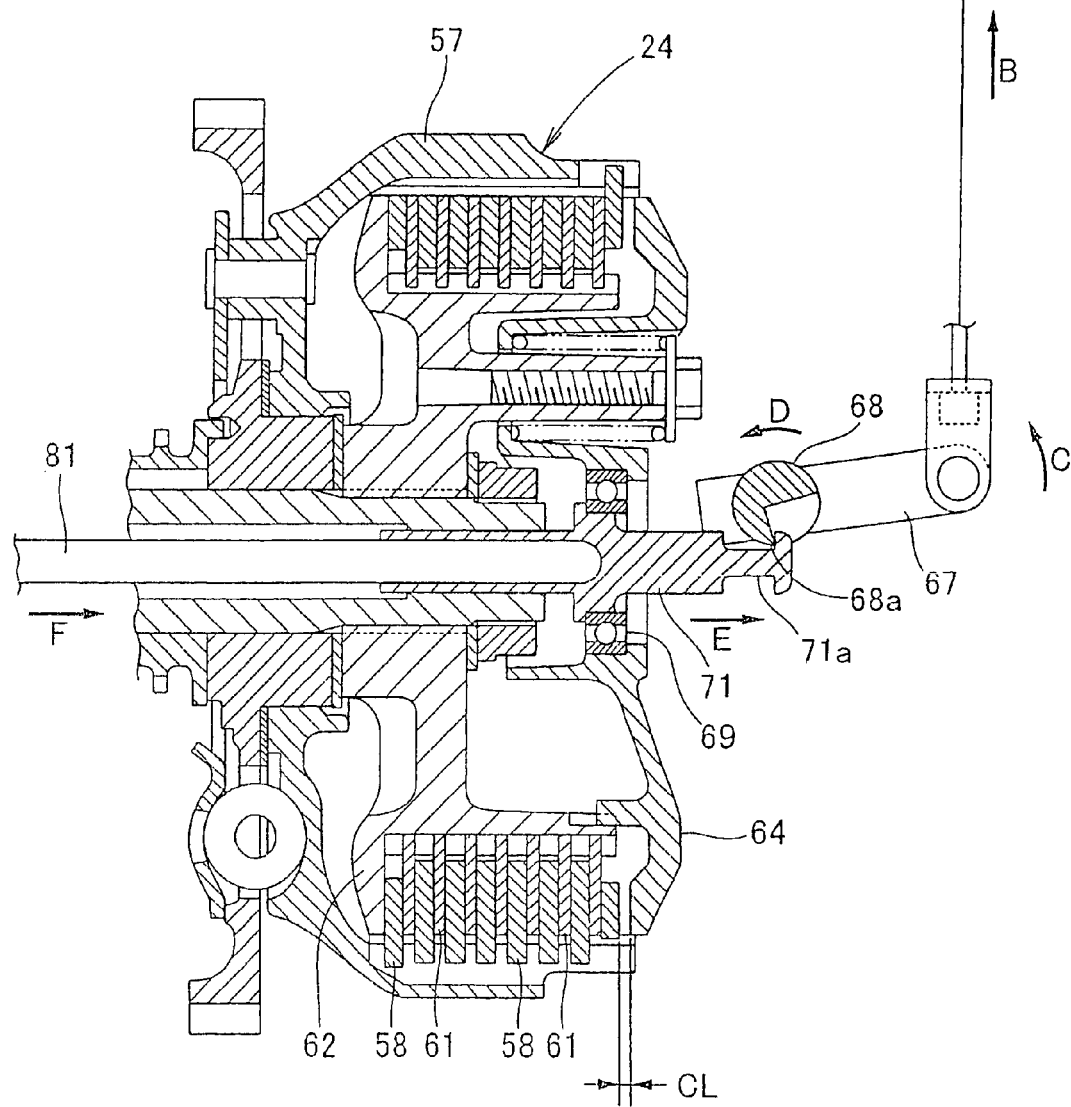

CLUTCH-MANIPULATION ASSIST MECHANISM

CROSS-REFERENCE TO RELATED APPLICATION

The present application claims priority under 35 U.S.C. §119 to Japanese Patent Application No. 2006-265299, filed Sep. 28, 2006, the entire contents of which are hereby incorporated by reference.

BACKGROUND OF THE INVENTION

1. Field of the Invention

The present invention relates to an improvement of a clutch-manipulation assist mechanism.

2. Description of Background Art

As a conventional clutch-manipulation assist mechanism, there has been known a clutch-manipulation assist mechanism which extends a wire cable from a clutch lever to a clutch mechanism of an engine, and mounts a sensor which detects the manipulation of the clutch lever on an intermediate portion of the wire cable.

Hereinafter, the above-mentioned clutch-manipulation assist mechanism shown in FIG. 1 to FIG. 3 of JP-A-2005-67450 is explained.

A clutch lever 12 is mounted on a handle of a motorcycle, a clutch mechanism is mounted on an engine 11 of the motorcycle, and a clutch arm 13 and the clutch lever 12 for operating the clutch mechanism are connected with each other using a wire cable 14.

An actuator 20 is mounted on an intermediate portion of the wire cable 14.

The actuator 20 is constituted of a housing 21, a swing lever 23 which is swingably mounted on the housing 21 and has a distal end thereof connected to an inner cable of the wire cable 14, a sensor 24 which detects a swinging angle of the swing lever 23 when the swing lever 23 is swung along with a manipulation of the clutch lever 12, an electrically-operated motor 22 which assists the swinging of the swing lever 23, and a CPU (not shown in the drawing) which controls an operation of the electrically-operated motor 22 based on a signal from the sensor 24.

The wire cable 14 is constituted of a wire cable 14A on a side of the clutch lever 12 of the swing lever 23, and a wire cable 14B on a side of the engine 11 of the swing lever 23.

The actuator 20 is connected to the clutch arm 13 by way of the wire cable 14B and hence, the sensor 24 is arranged remote from the clutch mechanism. Accordingly, for example, when an inner wire of the wire cable 14B is elongated, there arises a difference in the swinging angle of the swing lever 23 which is detected by the sensor 24 and a cutoff state of the clutch in the clutch mechanism between a case in which the inner wire of the wire cable 14B is elongated and a case in which the inner wire of the wire cable 14B is not elongated in the manipulation of the clutch lever 12. As a result, along with the elongation of the inner wire of the wire cable 14B, assist timing or an assist force generated by the electrically-operated motor 22 may differ from originally set values depending on a cutoff state or cutoff timing of the clutch.

It is an object of the present invention to provide a clutch-manipulation assist mechanism which can respond to a power cutoff by a clutch with a favorable responsiveness.

SUMMARY AND OBJECTS OF THE INVENTION

According to a first aspect of the present invention, a clutch-manipulation assist mechanism of a clutch mechanism is provided for disconnecting power of an engine. The clutch-manipulation assist mechanism is provided to a power transmission path which transmits the power of the engine to a wheel. The clutch-manipulation assist mechanism is configured such that a push rod member which is movable in the axial direction interlockingly with a power cutoff of the clutch mechanism due to a manipulation of a clutch manipulation member by a rider is arranged in the vicinity of the clutch mechanism. An axial movement of the push rod member is assisted by an actuator in response to a detection due to detection means of the manipulation of the clutch manipulation member by the rider, thus reducing a manipulation force of the clutch manipulation member. In addition, a detection portion of the detection means detects a movement quantity of a shaft end of the push rod member.

To explain the manner of operation, the push rod member is movable in the axial direction interlockingly with the power cutoff of the clutch mechanism due to the manipulation of the clutch manipulation member by the rider. Accordingly, by operating the actuator when the detection means detects the movement quantity of the shaft end of the push rod member, the movement of the push rod member in the axial direction is assisted and hence, a manipulation force of the rider for manipulating the clutch manipulation member can be decreased.

Conventionally, when the wire cable is provided between the sensor and the clutch mechanism, there exists a possibility that the sensor is influenced by the elongation of the wire cable thus giving rise to difference in timing between sensing by the sensor and power cutoff by the clutch mechanism. When such timing difference arises, there may be a case that a smooth assisting force can not be obtained.

To the contrary, according to the present invention, the movement quantity of the shaft end of the push rod member which moves interlockingly with the power cutoff of the clutch mechanism is detected by the detection portion of the detection means. Accordingly, it is possible to make the timing of sensing by the detection means and the timing of power cutoff by the clutch mechanism agree with each other.

According to a second aspect of the present invention, the detection means is arranged in a state that the detection portion is movable in the direction perpendicular to the movement of the push rod member.

To explain the manner of operation, the detection means is arranged in the state that the detection portion is movable in the direction perpendicular to the movement of the push rod member and hence, a projection quantity of the detection means in the axial direction of the push rod member can be suppressed.

According to a third aspect of the present invention, the intermediate member which is movable in the stroke direction of the detection portion is provided between the shaft end of the push rod member and the detection portion of the detection means.

To explain the manner of operation, for example, when the detection portion of the detection means is directly and perpendicularly brought into contact with the shaft end of the push rod member, the detection portion of the detection means always receives a force from the push rod member in the direction perpendicular to the stroke direction of the detection portion. Accordingly, when the clutch-manipulation assist mechanism is used for a long time in such a state, there may be a case that the detection portion may be mounted with a play or is worn. Accordingly, by providing the intermediate member between the shaft end of the push rod member and the detection portion of the detection means and by bringing the intermediate member into contact with the shaft end of the push rod member, the vibration resistance and the wear resistance of the detection portion of the detection means can be enhanced.

According to a fourth aspect of the present invention, the assist input portion being operable by the actuator is arranged in the vicinity of the shaft end of the push rod member on which the detection means is mounted, and the input portion for inputting the manipulation force from the clutch manipulation member to the push rod member is mounted on a shaft end on a side opposite to the shaft end.

To explain the manner of operation, on both shaft ends of the push rod member, the detection portion of the detection means, the assist input portion being operable by the actuator and the input portion for inputting the manipulation force from the clutch manipulation member to the push rod member are arranged.

Effects of the present invention include the following:

According to the first aspect of the present invention, the detection portion of the detection means detects the movement quantity of the shaft end of the push rod member and hence, it is possible to always make the timing of sensing by the detection means and the timing of power cutoff by the clutch mechanism agree with each other thus allowing the clutch-manipulation assist mechanism to respond to the power cutoff by the clutch mechanism with the favorable responsiveness.

According to the second aspect of the present invention, the detection portion is arranged to be movable in the direction perpendicular to the movement of the push rod member and hence, it is possible to suppress the projection quantity of the detection means in the axial direction of the push rod member while arranging the detection means on the shaft end of the push rod member. Accordingly, for example, a width of the transmission to which the push rod member and the detection means are provided can be decreased.

According to the third aspect of the present invention, the intermediate member which is movable in the stroke direction of the detection portion is provided between the shaft end of the push rod member and the detection portion of the detection means and hence, a force in the direction perpendicular to the axial direction is not directly applied to the detection portion of the detection means thus enhancing the vibration resistance and the wear resistance of the detection portion of the detection means.

According to the fourth aspect of the present invention, the assist input portion being operable by the actuator is arranged in the vicinity of the shaft end of the push rod member on which the detection means is mounted, and the input portion for inputting the manipulation force from the clutch manipulation member to the push rod member is mounted on the shaft end on the side opposite to the shaft end. Accordingly, it is possible to prevent the input portion for inputting the manipulation force from the clutch manipulation member to the push rod member, the detection portion of the detection means and the assist input portion from being arranged on one shaft end of the push rod member in a concentrated manner.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a first operational view showing the manner of operation of the clutch-manipulation assist mechanism according to the present invention;

DETAILED DESCRIPTION OF THE PREFERRED EMBODIMENTS

Figure 1:
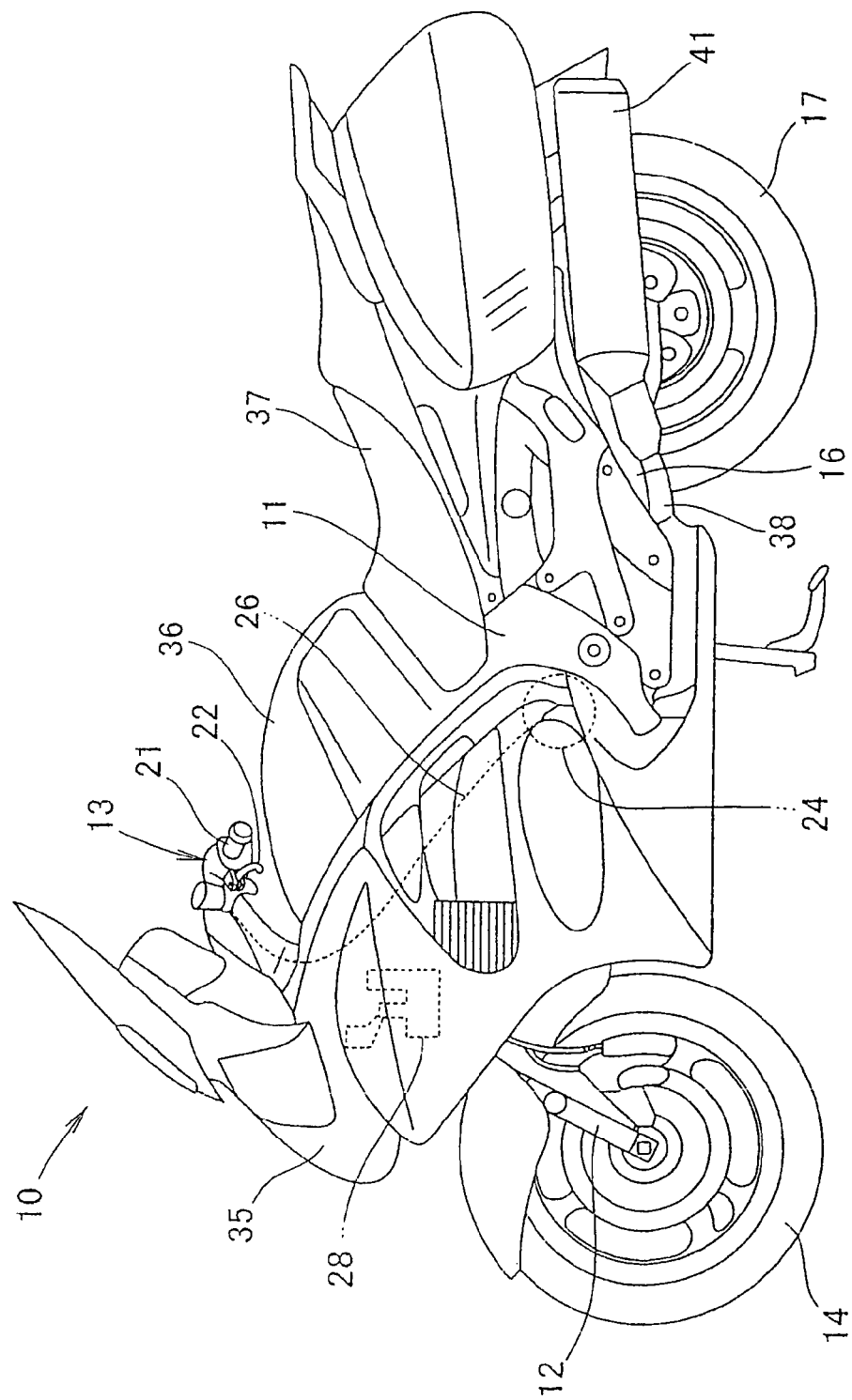
FIG. 1 is a side view showing a vehicle which includes a clutch-manipulation assist mechanism according to the present invention.

FIG. 1 is a side view showing a vehicle which includes a clutch-manipulation assist mechanism according to the present invention. In the drawing, the vehicle 10 includes a main frame 11 which constitutes a skeleton of the vehicle 10, a front fork 12 which is steerably mounted on a front end of the main frame 11, a bar handle 13 and a front wheel 14 which are respectively mounted on an upper end and a lower end of the front fork 12, a power unit (not shown in the drawing) which is mounted on a lower portion of the main frame 11, a swing arm 16 which is swingably mounted on a rear lower portion of the main frame 11, and a rear wheel 17 which is mounted on a rear end of the swing arm 16 and is driven by the power unit.

A left grip 21 and a clutch lever 22 are mounted on a left side of the bar handle 13.

The power unit is constituted of an engine and a transmission, and a clutch mechanism 24 is mounted on a side portion of the transmission.

The clutch mechanism 24 is connected to the clutch lever 22 using a clutch cable 26, and a clutch-manipulation assist mechanism for reducing a manipulation force of the clutch lever 22 is attached to the clutch mechanism 24. Here, numeral 28 indicates an assist pressure generator which constitutes a portion of the clutch-manipulation assist mechanism and, hereinafter, the assist pressure generator is referred to as "actuator 28".

Also shown are a cowling 35 which covers a front portion of a vehicle body, a fuel tank 36, a seat 37, an exhaust pipe 38 connected to the engine, and a muffler 41 connected to a rear end of the exhaust pipe 38.

Figure 2:
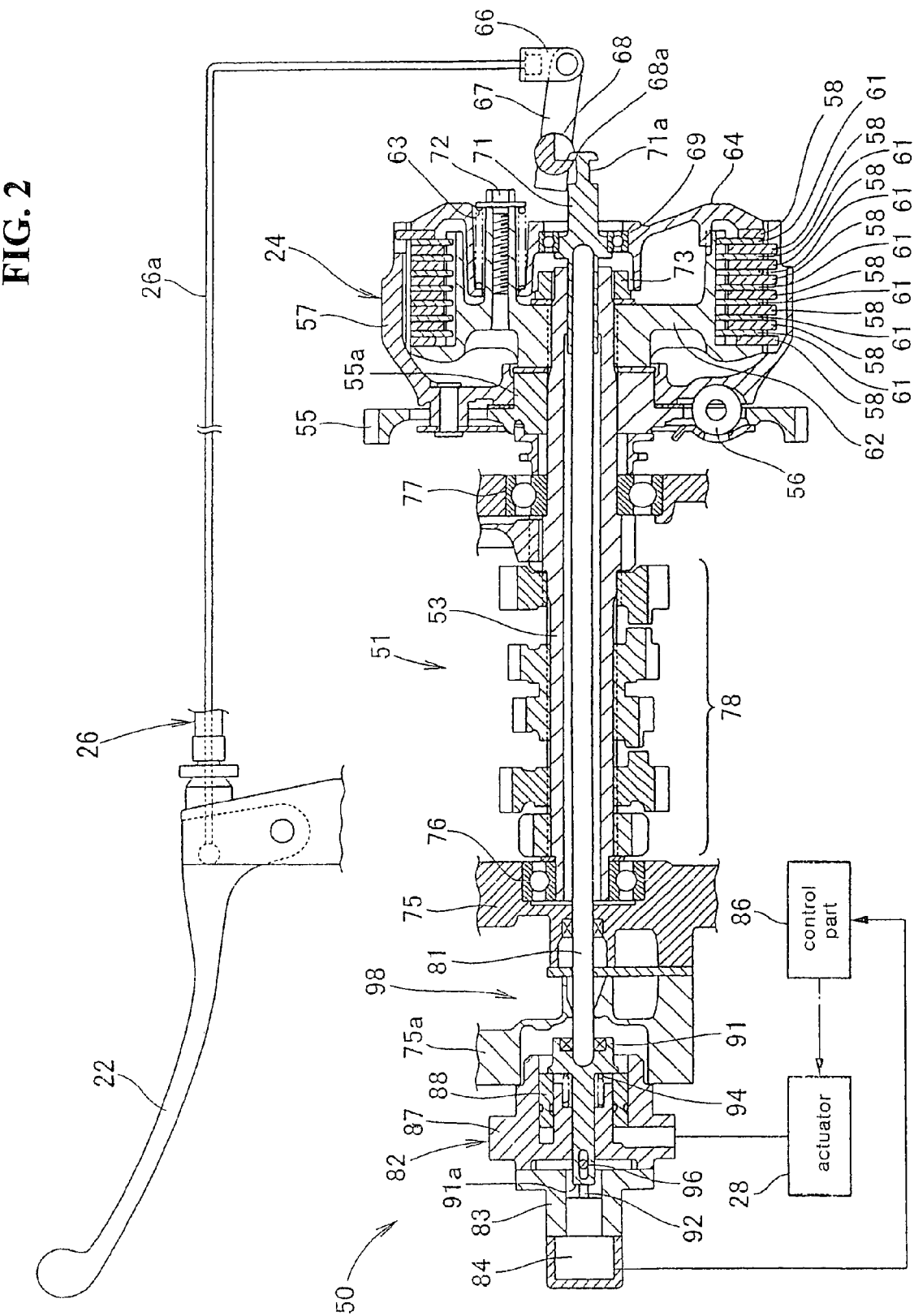
FIG. 2 is a cross-sectional view for explaining the clutch-manipulation assist mechanism according to the present invention.

FIG. 2 is a cross-sectional view for explaining the clutch-manipulation assist mechanism according to the present invention. When the power from the engine to the clutch mechanism 24 which is mounted on one end portion of the transmission 51 is cut off due to gripping of the clutch lever 22 by a rider, the clutch-manipulation assist mechanism 50 assists a gripping force, that is, a manipulation force. The clutch-manipulation assist mechanism is mounted on another end portion of the transmission 51.

The clutch mechanism 24 is a multi-disc clutch and is constituted of a large-sized driven gear 55, the inner portion 55a of which is rotatably mounted on a main shaft 53 constituting the transmission 51 and is meshed with a crankshaft-side gear, a drive member 57 which is mounted on the large-sized driven gear 55 by way of a coil spring 56, a plurality of clutch discs 58 constituting friction discs which is movable in the axial direction of the main shaft 53 and is engaged with an inner peripheral surface of the drive member 57 in the rotational direction, a plurality of clutch plates 61 which alternately overlap the clutch discs 58, a driven member 62 which is engaged with the main shaft 53 by spline fitting and with which inner peripheral portions of the clutch plates 61 are engaged in the rotational direction in a state that the inner peripheral portions of the clutch plates 61 are movable in the axial direction of the main shaft 53, a push member 64 which is mounted on the driven member 62 by way of a plurality of coil springs 63 and pushes the driven member 62 by way of the plurality of clutch discs 58 and the clutch plates 61, a clutch operation shaft 68 having an arm 67 which is connected to the clutch cable 26 by way of an end fitting 66, and an input member 71 which has an annular recessed input portion 71a formed in a distal end portion thereof engaged with a pawl portion 68a of the clutch operation shaft 68 and is arranged on the push member 64 by way of a bearing 69 and is movably mounted on an end portion of the main shaft 53. FIG. 2 also shows a bolt 72 for mounting the coil springs 63 which is provided for pushing the push member 64 to the driven member 62 and a plurality of bolts 72 is provided. Nut 73 is for mounting the driven member 62 on the main shaft 53.

The transmission 51 is configured such that the main shaft 53 is rotatably mounted on a housing 75 by way of bearings 76, 77, and a counter shaft not shown in the drawing is rotatably mounted on the housing 75 by way of a pair of bearings.

A drive gear train 78 which is constituted of a plurality of drive gears is joined to the main shaft 53 by spline fitting in an axially movable manner, a driven gear train which is constituted of a plurality of driven gears is joined to the counter shaft by spline fitting, the respective gears of the driven gear train are meshed with respective gears of the drive gear train 78, and the gears which transmit power are selected by a change gear mechanism not shown in the drawing.

The clutch-manipulation assist mechanism 50 is constituted of a push rod 81 which has a distal end thereof fitted in the input member 71 and passes through the inside of the main shaft 53, an assist cylinder 82 which is mounted on a cover 75a of a housing 75 side for applying an assist force to the push rod 81 when the push rod 81 is moved in the axial direction, a sensor holding portion 83 which is mounted on an end portion of the assist cylinder 82, a stroke sensor 84 which is held by the sensor holding portion 83 and detects an axial movement of the push rod 81, the actuator 28 which supplies oil pressure to the assist cylinder 82, and a control part 86 which controls an operation of the actuator 28 based on a detection signal from the stroke sensor 84.

The assist cylinder 82 is constituted of a cylinder body 87, a piston 88 which is movably inserted into the cylinder body 87 and is moved by oil pressure supplied from the actuator 28, and a pushing rod 91 which is movably inserted into the cylinder body 87 and is pushed by the push rod 81 using the piston 88, wherein a detection lug 92 of the stroke sensor 83 is brought into contact with an end surface 91a of the pushing rod 91. A coil spring 94 is provided between the cylinder body 87 and the pushing rod 91 and pushes the pushing rod 91 to the push rod 81, and a pin 96 is mounted on the cylinder body 87 for stopping the rotation of the pushing rod 91.

The above-mentioned push rod 81 and the pushing rod 91 are parts which constitute a push rod member 98.

Figure 4:
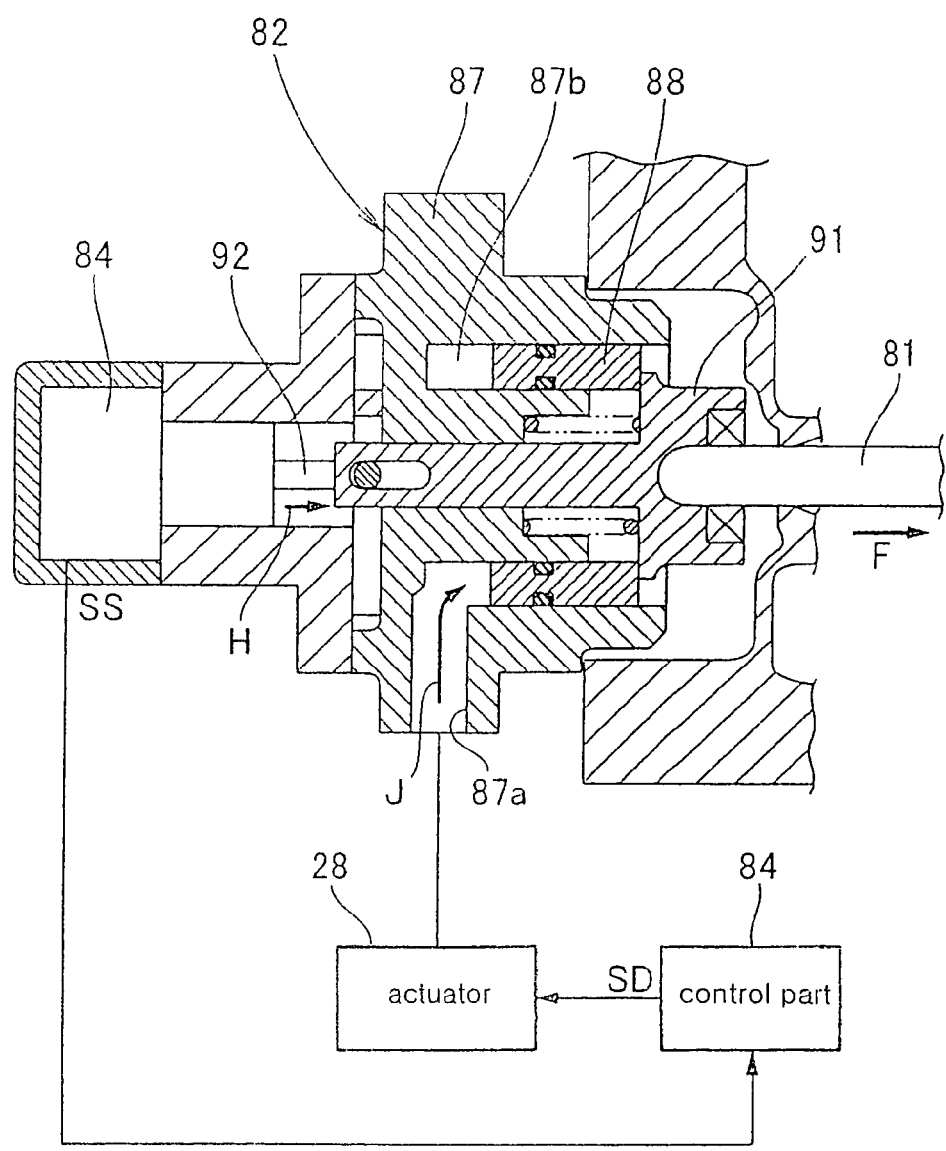
FIG. 4 is a second operational view showing the manner of operation of the clutch-manipulation assist mechanism according to the present invention.

The manner of operation of the above-mentioned clutch-manipulation assist mechanism 50 is explained in conjunction with FIG. 3 and FIG. 4.

FIG. 3 is a first operational view showing the manner of operation of the clutch-manipulation assist mechanism according to the present invention.

From a connection state that the push member 64 of the clutch mechanism 24 pushes the plurality of clutch discs 58 and the plurality of clutch plates 61 thus transmitting the power from the drive member 57 to the driven member 62, first of all, as indicated by an arrow A, when the rider performs a swing manipulation by gripping the clutch lever 22, the inner wire 26a of the clutch cable 26 is pulled as indicated by an arrow B, the arm 67 is swung as indicated by an arrow C, and the clutch operation shaft 68 is rotated as indicated by an arrow D.

As a result, the pawl portion 68a of the clutch operation shaft 68 pulls the input member 71 in the direction of an arrow E and hence, the push member 64 is separated from the clutch discs 58 by a distance CL by way of the bearing 69 and hence, a pushing force which pushes the respective clutch discs 58 and the respective clutch plates 61 is almost released whereby a frictional force is hardly generated between the respective clutch discs 58 and the respective clutch plates 61 thus disengaging the clutch mechanism 24. That is, the power is not transmitted to the driven member 62 from the drive member 57.

At the same time, the push rod 81 is also moved in the axial direction together with the input member 71 as indicated by an arrow F.

FIG. 4 is a second operational view showing the manner of operation of the clutch-manipulation assist mechanism according to the present invention.

When the push rod 81 is moved to an input member 71 (see FIG. 3) side as indicated by the arrow F, the pushing rod 91 which is brought into contact with an end portion of the push rod 81 is moved in the same direction as the push rod 81, and the detection lug 92 of the stroke sensor 84 which is brought into contact with an end surface of the pushing rod 91 imparts a stroke as indicated by an arrow H and hence, a stroke signal SS is outputted from the stroke sensor 84 and is inputted into the control part 86.

The control part 86 transmits a drive signal SD to the actuator 28 based on the stroke signal SS to drive the actuator 28 and generates oil pressure. As a result, as indicated by an arrow J, a working fluid flows into an oil chamber 87b from an oil passage 87a in the inside of the cylinder body 87 and hence, the piston 88 is moved in the right direction in the drawing. Accordingly, along with the movement of the piston 88, a movement of the push rod 81 in the direction of the arrow F is assisted by way the pushing rod 91.

Figure 5:
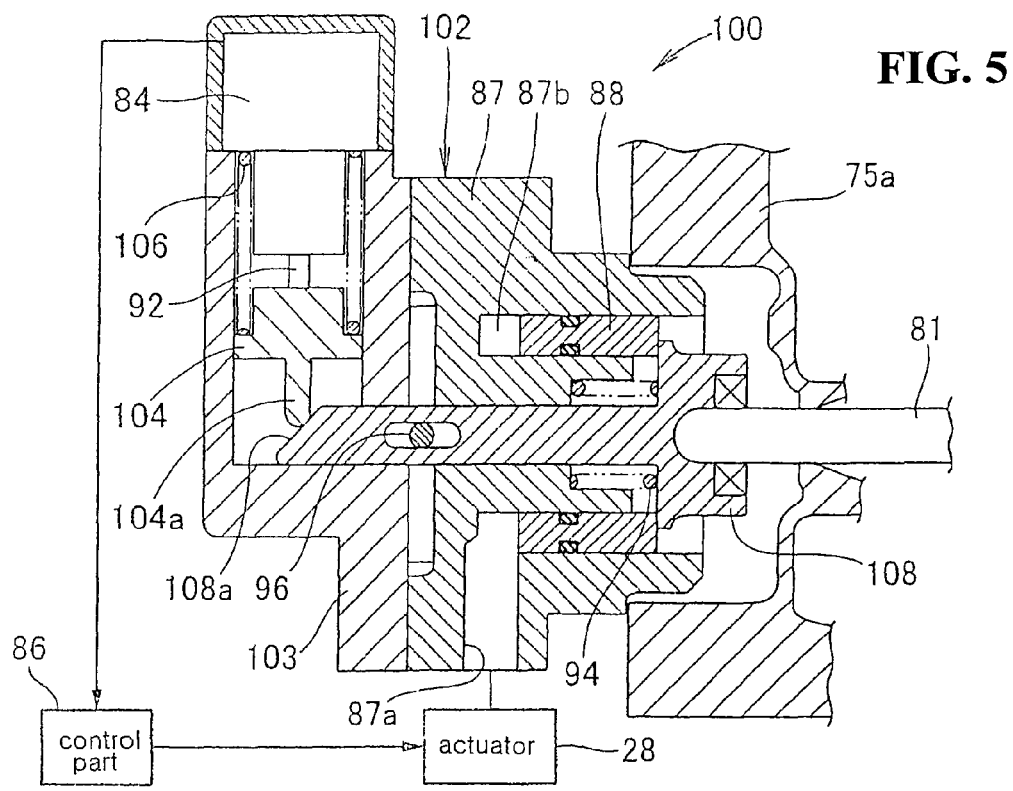
FIG. 5 is a cross-sectional view showing a modification of the clutch-manipulation assist mechanism according to the present invention.

FIG. 5 is a cross-sectional view showing a modification of the clutch-manipulation assist mechanism according to the present invention. In the drawing, parts having the constitution identical with the parts of the above-mentioned embodiment shown in FIG. 2 are given same symbols and the detailed explanation thereof is omitted.

A clutch-manipulation assist mechanism 100 is constituted of the push rod 81, an assist cylinder 102 which is mounted on the cover 75a for applying an assist force to the push rod 81 when the push rod 81 is moved in the axial direction, a sensor holding portion 103 which is mounted on an end portion of the assist cylinder 102, a push lug 104 which is movably housed in the inside of the sensor holding portion 103 in the direction perpendicular to the axial direction of the push rod 81, a stroke sensor 84 which is mounted on an end portion of the sensor holding portion 103 and detects an axial movement of the push rod 81 by way of the push lug 104, an actuator 28, and a control part 86. A coil spring 106 which is interposed between the stroke sensor 84 and the push lug 104 for pushing out the push lug 104 to the stroke sensor 84.

The assist cylinder 102 is constituted of the cylinder body 87, the piston 88, and a pushing rod 108 which is movably inserted into the cylinder body 87 and is pushed to the push rod 81 using the piston 88.

The pushing rod 108 forms an inclination surface 108a on an end portion thereof, and a projection portion 104a of the push lug 104 is pushed to the inclination surface 108 by the coil spring 106.

Figure 6:
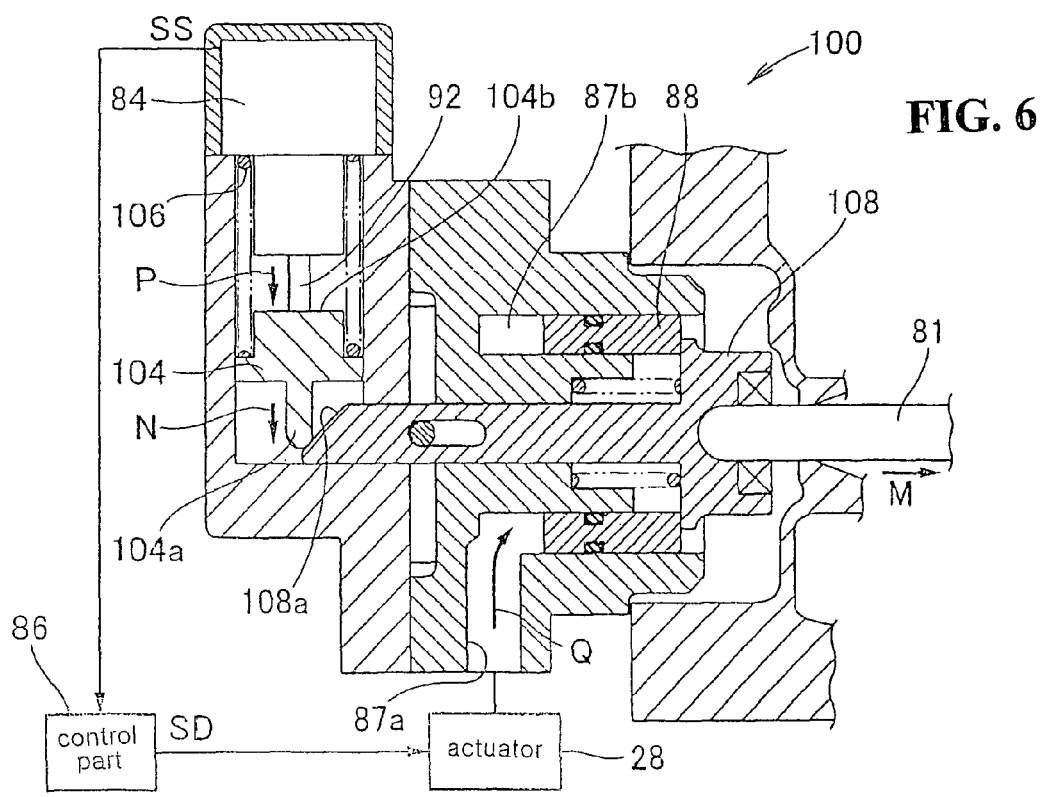
FIG. 6 is a third operational view showing the manner of operation of a modification of the clutch-manipulation assist mechanism according to the present invention.

The manner of operation of the above-mentioned clutch-manipulation assist mechanism 100 is explained in conjunction with FIG. 6.

FIG. 6 is a third operational view showing the manner of operation of the modification of the clutch-manipulation assist mechanism according to the present invention.

When the rider grips the clutch lever (see FIG. 2) to perform a manipulation for interrupting the power transmission from the engine to the transmission, as indicated by an arrow M, the push rod 81 is moved to the input member 71 (see FIG. 3) side and hence, the pushing rod 108 which is brought into contact with the end portion of the push rod 81 is also moved in the same direction as the push rod 81 whereby the push lug 104 which is perpendicularly brought into contact with the inclination surface 108a of the pushing rod 108 descends while being brought into contact with the inclination surface 108a as indicated by an arrow N. Along with descending of the push lug 104, the detection lug 92 of the stroke sensor 84 which is brought into contact with a back surface 104b of the push lug 104 performs a stroke as indicated by an arrow P and hence, the stroke signal SS is outputted from the stroke sensor 84 and is inputted into the control part 86.

As a result, in the same manner as the manner of operation shown in FIG. 4, the control part 86 transmits the drive signal SD to the actuator 28 based on the stroke signal SS to drive the actuator 28 thus generating the oil pressure, and as indicated by an arrow Q, a working fluid flows into the oil chamber 87b from the oil passage 87a in the inside of the cylinder body 87 and the piston 88 is moved to a right side in the drawing and hence, the movement of the push rod 81 in the direction of an arrow M is assisted by way of the pushing rod 108.

As has been explained heretofore in conjunction with FIG. 1, FIG. 2 and FIG. 5, in the clutch-manipulation assist mechanism 50, 100 of the clutch mechanism 24 which disconnects the power of the engine and is provided to the power transmission path which transmits the power of the engine to the rear wheel 17 which is used as a wheel, the clutch-manipulation assist mechanism being configured such that the push rod member 98 which is movable in the axial direction interlockingly with a power cutoff of the clutch mechanism 24 due to the manipulation of the clutch lever 22 which is used as the clutch manipulation member of the rider is arranged in the vicinity of the clutch mechanism 24.

The axial movement of the push rod member 98 is assisted by the actuator 28 in response to the detection of the clutch lever manipulation by the rider using the stroke sensor 84 which is used as the detection means, thus reducing a manipulation force of the clutch lever 22. The detection lug 92 of the stroke sensor 84 which constitutes the detection portion is configured to detect a movement quantity of a shaft end of the push rod member 98.

Due to such a constitution, when the push rod member 98 is moved in the axial direction along with the disengagement of the clutch mechanism 24, it is possible to integrally detect the movement of the push rod member 98 using the stroke sensor 84 by way of the pushing rod 91 thus always making the timing of sensing by the stroke sensor 84 and the timing of power cutoff by the clutch mechanism 24 agree with each other. Accordingly, it is possible to allow the clutch-manipulation assist mechanism 50, 100 to respond to the power cutoff by the clutch mechanism 24 with a favorable responsiveness.

The stroke sensor 84 is arranged in a state that the detection lug 92 performs a stroke in the direction inclined by 90° with respect to an axis of the push rod member 98.

Accordingly, while arranging the stroke sensor 84 on the shaft end of the push rod member 98, it is possible to decrease a projection quantity of the stroke sensor 84 in the axial direction of the push rod member 98 thus reducing a width of the transmission 51 to which the push rod member 98 and the stroke sensor 84 are provided, for example.

The push lug 104 which constitutes an intermediate member and is movable in the stroke direction of the detection lug 92 is provided between the shaft end of the push rod member 98 and the detection lug 92 of the stroke sensor 84.

Accordingly, the force in the direction perpendicular to the axial direction is not directly applied to the detection lug 92 of the stroke sensor 84 and hence, the vibration resistance and the wear resistance of the detection lug 92 of the stroke sensor 84 can be enhanced.

The assist cylinder 82 which is used as the assist input portion being operable by the actuator 28 is arranged in the vicinity of the shaft end of the push rod member 98 on which the stroke sensor 84 is mounted, and the input portion for inputting the manipulation force from the clutch lever 22 to the push rod member 98 is mounted on the shaft end on the side opposite to the shaft end of the push rod member 98.

Accordingly, it is possible to prevent the input portion for inputting the manipulation force from the clutch lever 22 to the push rod member 98, the stroke sensor 84 and the assist cylinder 82 from being arranged on one shaft end of the push rod member 98 in a concentrated manner.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A clutch-manipulation assist mechanism of a clutch mechanism which disconnects a power of an engine and which is provided to a power transmission path for transmitting the power of the engine to a wheel, the clutch-manipulation assist mechanism comprising:

detection means adapted to detect a manipulation of a clutch manipulation member by a rider;

a push rod member operatively connected to the clutch mechanism, the push rod member including a push rod which has a distal end thereof fitted in an input member and which passes through an inside of a main shaft, the push rod being movable in an axial direction interlockingly with a power cutoff of the clutch mechanism due to the manipulation of the clutch manipulation member; and an actuator adapted to assist an axial movement of the push rod member in response to the detection of the manipulation of the clutch manipulation member by the rider thus reducing a manipulation force of the clutch manipulation member, wherein a detection portion of the detection means detects a movement quantity of a shaft end of the push rod member.

2. The clutch-manipulation assist mechanism according to claim 1, wherein the detection means is arranged in a state that the detection portion is movable in the direction perpendicular to the movement of the push rod member.

3. The clutch-manipulation assist mechanism according to claim 2, further comprising an intermediate member which is movable in a stroke direction of the detection portion, the intermediate member being provided between the shaft end of the push rod member and the detection portion of the detection means.

4. The clutch-manipulation assist mechanism according to claim 3, further comprising:

a sensor holding portion for holding the detection means and which is mounted on an end portion of the assist input portion, wherein the intermediate portion is movably housed inside the sensor holding portion in the direction perpendicular to the axial direction of the push rod.

5. The clutch-manipulation assist mechanism according to claim 4, wherein the detection means is mounted on an end portion of the sensor holding portion and detects the axial movement of a push rod of the push rod member by way of the intermediate member, the actuator, and a control part.

6. The clutch-manipulation assist mechanism according to claim 1, further comprising:

an assist input portion operable by the actuator and arranged adjacent to the shaft end of the push rod member on which the detection means is mounted, and an input portion for inputting the manipulation force from the clutch manipulation member to the push rod member, the input portion being mounted on a shaft end on a side opposite to the shaft end.

7. The clutch-manipulation assist mechanism according to claim 6, wherein the assist input portion of the clutch-manipulation assist mechanism further includes:

a cylinder body, a piston which is movably inserted into the cylinder body and is moved by pressure supplied from the actuator, and a pushing rod which is movably inserted into the cylinder body and is pushed by the push rod using a piston.

8. The clutch-manipulation assist mechanism according to claim 7, wherein the assist input portion of the clutch-manipulation assist mechanism further includes:

a coil spring provided between the cylinder body and the pushing rod, the coil spring being adapted to push the pushing rod to the push rod, and a pin mounted on the cylinder body for stopping rotation of the pushing rod.

9. The clutch-manipulation assist mechanism according to claim 1, wherein the clutch-manipulation assist mechanism further includes:

an assist input portion which is mounted on a cover of a housing side for applying an assist force to the push rod when the push rod is moved in the axial direction.

10. The clutch-manipulation assist mechanism according to claim 9, wherein the clutch-manipulation assist mechanism further includes:

a sensor holding portion mounted on an end portion of the assist input portion, the sensor holding portion for holding the detection means, and a control part which controls an operation of the actuator based on a detection signal from the detection means.

11. A clutch-manipulation assist mechanism of a clutch mechanism which disconnects a power of an engine and which is provided to a power transmission path for transmitting the power of the engine to a wheel, the clutch-manipulation assist mechanism comprising:

detection means adapted to detect a manipulation of a clutch manipulation member by a rider;

a push rod member disposed coaxially with the clutch mechanism, the push rod member being movable in an axial direction interlockingly with a power cutoff of the clutch mechanism due to the manipulation of the clutch manipulation member; and, an actuator adapted to assist an axial movement of the push rod member in response to the detection of the manipulation of the clutch manipulation member by the rider thus reducing a manipulation force of the clutch manipulation member, wherein a detection portion of the detection means detects a movement quantity of a shaft end of the push rod member.

12. The clutch-manipulation assist mechanism according to claim 11, wherein the detection means is arranged in a state that the detection portion is movable in the direction perpendicular to the movement of the push rod member.

13. The clutch-manipulation assist mechanism according to claim 12, further comprising an intermediate member which is movable in a stroke direction of the detection portion, the intermediate member being provided between the shaft end of the push rod member and the detection portion of the detection means.

14. The clutch-manipulation assist mechanism according to claim 13, further comprising:

a sensor holding portion for holding the detection means and which is mounted on an end portion of the assist input portion, wherein the intermediate portion is movably housed inside the sensor holding portion in the direction perpendicular to the axial direction of the push rod.

15. The clutch-manipulation assist mechanism according to claim 14, wherein the detection means is mounted on an end portion of the sensor holding portion and detects the axial movement of a push rod of the push rod member by way of the intermediate member, the actuator, and a control part.

16. The clutch-manipulation assist mechanism according to claim 11, further comprising:

an assist input portion operable by the actuator and arranged adjacent to the shaft end of the push rod member on which the detection means is mounted, and an input portion for inputting the manipulation force from the clutch manipulation member to the push rod member, the input portion being mounted on a shaft end on a side opposite to the shaft end.

17. The clutch-manipulation assist mechanism according to claim 16, wherein the assist input portion of the clutch-manipulation assist mechanism further includes:

a cylinder body, a piston which is movably inserted into the cylinder body and is moved by pressure supplied from the actuator, and a pushing rod which is movably inserted into the cylinder body and is pushed by the push rod using a piston.

18. The clutch-manipulation assist mechanism according to claim 17, wherein the assist input portion of the clutch-manipulation assist mechanism further includes:

a coil spring provided between the cylinder body and the pushing rod, the coil spring being adapted to push the pushing rod to the push rod, and a pin mounted on the cylinder body for stopping rotation of the pushing rod.

19. The clutch-manipulation assist mechanism according to claim 11, wherein the clutch-manipulation assist mechanism further includes:

a push rod which has a distal end thereof fitted in an input member and which passes through an inside of a main shaft, and an assist input portion which is mounted on a cover of a housing side for applying an assist force to the push rod when the push rod is moved in the axial direction.

20. The clutch-manipulation assist mechanism according to claim 19, wherein the clutch-manipulation assist mechanism further includes:

a sensor holding portion mounted on an end portion of the assist input portion, the sensor holding portion for holding the detection means, and a control part which controls an operation of the actuator based on a detection signal from the detection means.

* * * * *